(12) United States Patent
Jaeger

(10) Patent No.: US 8,221,857 B2
(45) Date of Patent: Jul. 17, 2012

(54) INSULATING GLAZING ELEMENT, ITS MANUFACTURE AND USE

(75) Inventor: Steffen Jaeger, Braunschweig (DE)

(73) Assignee: Steffen Jager (DE)

(*) Notice: Subject to any disclaimer, the term of this patent is extended or adjusted under 35 U.S.C. 154(b) by 498 days.

(21) Appl. No.: 12/519,606

(22) PCT Filed: Dec. 14, 2007

(86) PCT No.: PCT/EP2007/011012
§ 371 (c)(1),
(2), (4) Date: Jun. 17, 2009

(87) PCT Pub. No.: WO2008/077512
PCT Pub. Date: Jul. 3, 2008

(65) Prior Publication Data
US 2009/0324858 A1    Dec. 31, 2009

(30) Foreign Application Priority Data
Dec. 22, 2006  (DE) .................. 10 2006 061 360

(51) Int. Cl.
*E06B 3/24* (2006.01)
*E04C 2/54* (2006.01)
*C03C 27/00* (2006.01)

(52) U.S. Cl. ....... 428/34; 52/786.1; 52/786.13; 156/109

(58) Field of Classification Search .................... 428/34, 428/212; 52/204.5, 786.1, 786.13; 156/109
See application file for complete search history.

(56) References Cited

U.S. PATENT DOCUMENTS

| 5,059,458 A * | 10/1991 | Goodall .......................... 428/34 |
| 6,478,911 B1 | 11/2002 | Wang et al. |
| 2004/0028845 A1 * | 2/2004 | Asano et al. .................... 428/34 |

FOREIGN PATENT DOCUMENTS

| DE | 202 05 588 | 10/2002 |
| DE | 203 04 319 | 6/2003 |
| DE | 698 09 680 | 7/2003 |
| DE | 102 58 377 | 6/2004 |
| EP | 1 529 921 A2 | 5/2005 |
| WO | WO 91/02878 A1 | 3/1991 |
| WO | WO 93/15296 A1 | 8/1993 |
| WO | WO 03/087516 | 10/2003 |

* cited by examiner

Primary Examiner — Donald J Loney
(74) Attorney, Agent, or Firm — DLA Piper LLP (US)

(57) ABSTRACT

Insulating glazing element comprising a glass pane arrangement with a first outward pointing glass pane, a second inward pointing glass pane and at least a third glass pane arranged on the inside between the glass panes, wherein the glass panes comprise surfaces arranged on the inside, a spacer assembly provided for setting a distance between the glass panes and an edge seal assembly provided for sealing gaps between the glass panes against the surroundings, wherein the glazing element is set up in such a way that the pressure in the gaps is lower compared to the exterior atmospheric pressure, wherein at least one of the surfaces arranged on the inside comprises at least one low emissivity coating layer, the condition $0.3 \leq (A_1/A_2) \leq 4$ is met for the solar absorptions $A_1, A_2$ of the first and second glass pane, and the solar absorption of the third glass pane is $A_3 \leq 0.17$.

33 Claims, 9 Drawing Sheets

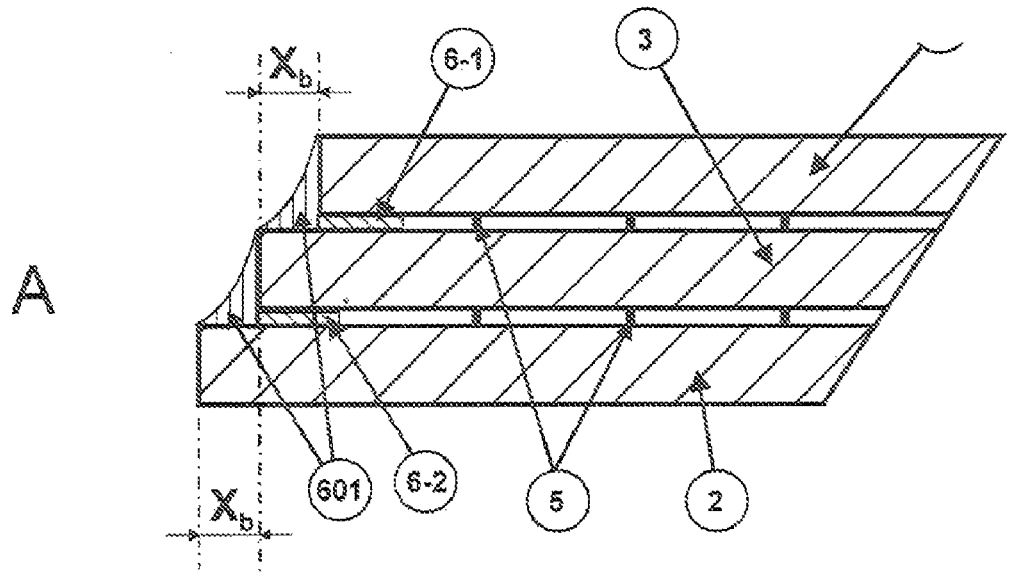
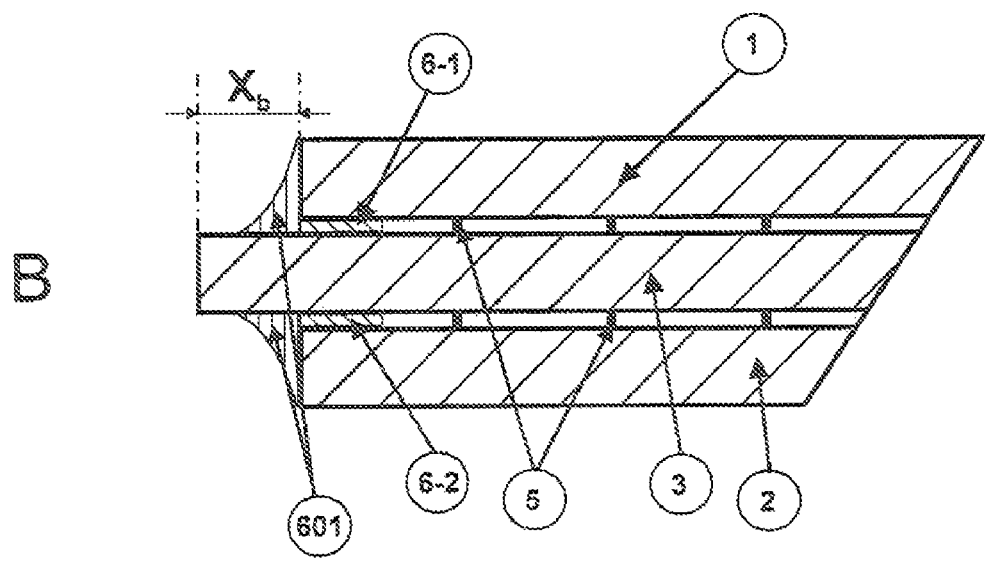
FIG. 5 (A, B)

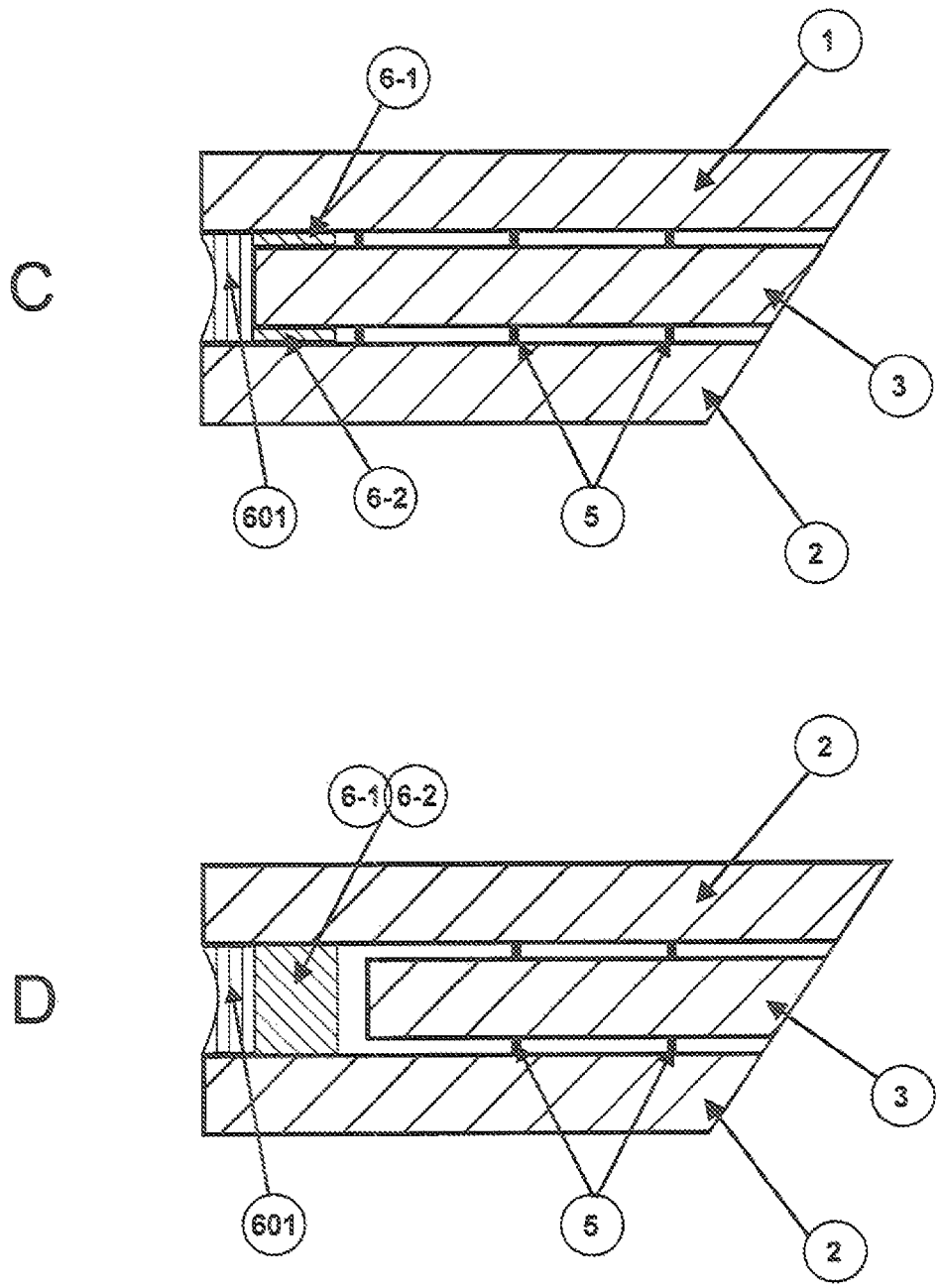
FIG. 5 (C, D)

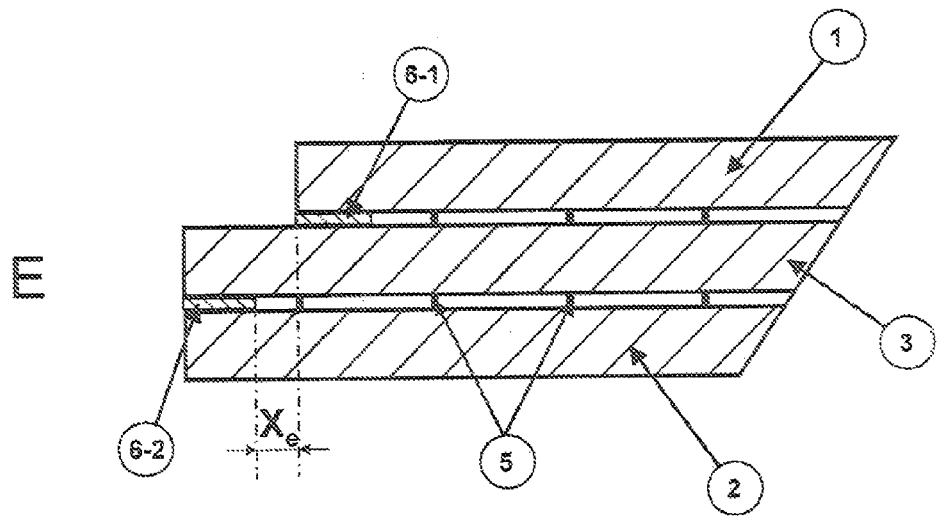
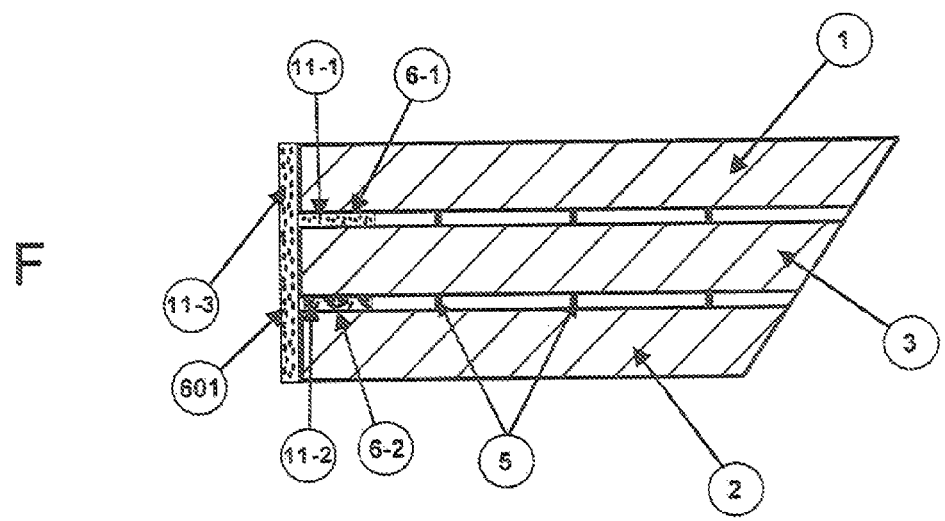
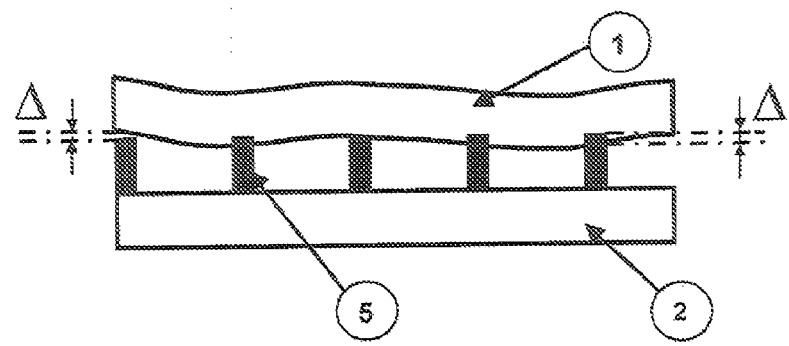
FIG. 5 (E. F)
FIG. 6

INSULATING GLAZING ELEMENT, ITS MANUFACTURE AND USE

RELATED APPLICATION

This is a §371 of International Application No. PCT/EP2007/011012, with an international filing date of Dec. 14, 2007 (WO 2008/077512 A3, published Jul. 3, 2008), which is based on German Patent Application No. 10 2006 061 360.0 filed Dec. 22, 2006.

TECHNICAL FIELD

The disclosure relates to an insulating glazing element, a component comprising the glazing element and methods for the manufacture of the glazing element and the component as well as their use.

BACKGROUND

WO 91/02878 and WO 93/15296 relate to a vacuum-insulated glass comprising two adjoining glass panes enclosing an evacuated space. The glass panes are spaced apart from one another by spacer assemblies and joined by means of an edge seal around the circumference. The vacuum between the glass panes is generated via opening in one of the glass panes. The known vacuum-insulated glasses have not been able to establish themselves on the market. The vacuum-insulated glasses currently available on the market have only been able to achieve inadequate thermal insulation values (U values) of $1.0\,W/(m^2 K)$ or less, but these values are easily achieved with standard insulating glasses. Indeed, laboratory-scale research has shown that U values of up to approximately $0.4\,W/(m^2 K)$ are achieved, but these results were practically limited to small-scale laboratory patterns. The transfer of the laboratory experiments to larger formats of at least $0.8\,m^2$ and more were unsuccessful thus far. This is mainly due to the fact that a host of unresolved practice-related problems concerning the functionality and usability are associated with the known vacuum-insulated glasses. For example, the practical use of the known vacuum-insulated glasses very often results in impairment or damage in the form of breakage of glass, leakiness or loss of vacuum etc. which in many cases can result in the complete uselessness or complete failure of the component. This mainly affects areas at the interlocked edges and especially the corners. It was determined that these shortcomings only become manifest with larger geometrical dimensions of at least approximately $0.4\,m^2$ and especially larger, while said occurrences have not been observed in the small laboratory patterns in the format of typically at most 500 mm×500 mm (up to areas of at most $0.25\,m^2$).

Some disadvantages and other technology-related problems associated with the known vacuum-insulated glasses are described in more detail below. In the practical application, vacuum-insulated glasses are required to withstand varying, potentially extreme exterior conditions without any loss of function and damage. Such changing conditions are associated e.g. with fluctuating seasonal weather conditions. For example, exterior temperatures in winter can definitely reach values of −20° C. to −25° C. and lower, while temperatures inside the building typically hover around +20° C. Consequently, a temperature difference between the interior and exterior pane of 40K to 50K and greater is common. These high temperature differences also occur in vacuum-insulated glasses in cooling facilities. Moreover, the vacuum-insulated glasses are exposed to high heat in the summer time. Aside from the high exterior air temperatures of 30° C. to 40° C., high sun irradiation with values typically ranging between at least 800 $W/m^2$ to 1.200 $W/m^2$ also occur. As well, it is possible that the inward facing glasses are additionally exposed to convective cooling for example due to air conditioning and/or high humidity (for example in the bath or sanitation facilities). However, the outward facing glasses can equally be prone to additional signs of exposure, for example as a result of wind, rain, snow, ice rain etc. To preserve the full usability, vacuum-insulated glasses are required to meet these complex requirements in their entirety. Practice has shown that the traditional vacuum-insulated glasses thus far failed to achieve this or only achieve it to a very limited degree.

The mentioned temperature differences cause deflections between the exterior and interior panes of vacuum-insulated glasses—similar to the bimetal effect—which are largely compensated by the vacuum edge seal. The associated excessive shearing forces in the area of the vacuum edge seal and/or the elevated tensile stress on the glass surface damage or destroy the entire glazing element. The resulting forces can reach values of up to 20 MPa and more. This is especially disadvantageous in cases in which the insulation (U value in the centre of the component) of the vacuum-insulated glasses is typically smaller or equal to 0.8 $W/(m^2 K)$, because the heat exchange and as a result ultimately the temperature equalisation between the glass panes is almost completely inhibited. This problem has not yet been resolved for highly insulating vacuum-insulated glasses with sizes of $0.4\,m^2$ and more.

Another disadvantage is that the spacer assemblies between the individual glass panes represent cold bridges and undesirable locally confined condensation may be observed preferably at the positions of the spacer assemblies as a result. This effect is all the more pronounced the lower the temperature on one side of the glazing is and the greater the resulting temperature difference between the two glass panes is. This is particularly bothersome in connection with exterior glazing during the cold season or in connection with vacuum-insulated glasses in refrigerating sets. The known vacuum-insulated glasses are not suitable to adequately minimize or prevent this undesirable effect.

An additional disadvantage of the traditional vacuum-insulated glazing is that it can not be produced fully serviceable in any arbitrary geometrical shapes, outlines and sizes. This also applies in particular to vacuum-insulated glasses comprising a bent, curved or other shape that deviates from a planarity.

An additional disadvantage is that the traditional vacuum-insulated glasses are significantly more expensive compared to conventional insulated glasses. To this day it has been impossible to significantly reduce the costs by means of improved process technology.

It could therefore be helpful to provide an improved insulating glazing element with which the disadvantages of traditional vacuum-insulated glasses can be overcome. Moreover, it could be helpful to provide an improved component comprising said glazing element and cost-efficient methods for the manufacture of the glazing element and the component.

SUMMARY

Pursuant to a first aspect of the invention, a glazing element is provided comprising a first outward pointing glass pane, a second inward pointing glass pane and at least a third glass pane arranged between the first and second glass panes, wherein the glass panes meet the following conditions. With respect to the solar absorption $A_1$ of the first (always outward pointing) glass pane and with respect to the solar absorption $A_2$ of the second (always inward pointing) glass pane, the condition $$0.3 \leq (A_1/A_2) \leq 4 \quad (1)$$

applies, wherein with respect to the solar absorption $A_3$ of the third (always positioned in between) glass pane, the condition $$A_3 \leq 17\% \quad (2)$$

(preferably $A_3 \leq 10\%$) applies at the same time. An additional important characteristic of the glazing element according to the invention is that at least one of the interior surfaces of the glass panes contains a low emissivity coating layer. The low emissivity coating layer is characterised by a degree of emissivity which is preferably $\leq 0.16$, especially preferred $\leq 0.09$, such as e.g. $=0.05$. Advantageously the at least one low emissivity coating layer interacts with the solar absorption pursuant to the mentioned conditions (1) and (2) in such a way that thermal stress due to large temperature differences on the exterior and interior sides of the glazing element is prevented.

Pursuant to a second aspect, a component is provided comprising at least one glazing element. The component comprises a composition of the at least one glazing element with a least one additional glass component comprising at least one glass pane or at least one glass pane system. For example, an additional glass component can be arranged one-sided on the glazing element. Alternatively, a plurality of glass components can be arranged one- or two-sided, on the glazing element. At least one glazing element can be combined with a traditional insulated glass assembly in the component.

Pursuant to the third aspect, a method for the manufacture of the glazing element is provided for which the glass panes forming the glazing element are subject to thermal hardening as a stack of glass panes.

Disadvantages of traditional vacuum-insulated glasses can be overcome with the realisation of a glazing element that meets the mentioned conditions. In particular, a complete usability of the glazing element or the component formed with the latter is achieved with the exposure to different, in some cases extreme exterior conditions, independent of the geometrical size of the latter. The fact that the glazing element is designed in such a way that the conditions (1) and (2) for the solar absorptions $A_1, A_2, A_3$ of the glass panes are met, results in the complete usability. The condition (2) is not restricted to insulating glazing elements consisting of the three glass panes, but equally comprises glazing elements with more than three glass panes.

The results are not expected and are surprising because the dependency of the utilisation characteristics including the stability and service life of the glazing element from the solar absorptions of the individual glass panes corresponding to the mentioned conditions of conventional insulated glasses or vacuum-insulated glasses is unknown. In addition, the achievement does not depend on details concerning the design of the spacer assemblies (material, shape, size, type of attachment) and the vacuum edge seal (material, geometrical shape). In fact, the separate observation of the individual values of the solar absorption $A_i$ of the individual glass panes within the entire spectral region of approximately 280 nm to 2500 nm is primarily relevant with respect to the solution.

The mentioned conditions (1) and (2) allow the minimisation of mechanical stress exerted on the entire glazing element or component, thus preventing damage and ultimately failure. The realisation in particular of the mentioned conditions (1) and (2) results in the overlap of various force components (shearing forces, compressive and tensile forces) in such a way that the resulting force which is relevant to the usability is reduced and the pivotal point that is critical for the damage or destruction is not reached.

There is a practical advantage because the usability and as a result the full functionality of the insulating glazing element for various sizes and geometries can now be based on simple rules and operating instructions. Therefore, the user is provided with an easy to manage tool designed to help him or her customize a glazing for a specific application.

The term "glazing element" generally describes a window structure designed to be installed into a wall e. g. of a structure, a means of transportation or a case (container) or a technical apparatus. The glazing element comprises an exterior side and an interior side, i. e. the glazing element is designed to be installed into the wall or an apparatus with a defined orientation. The glazing element may be designed in such a way that the exterior side is facing an adjacent room with a lower temperature than the one on the interior side. For example, the exterior side of the glazing element is facing the surroundings of the wall, while the interior side is facing an interior room enclosed by the wall. Typically, the temperature in the surroundings is lower than in the interior room. When the glazing element is used in an apparatus, the temperatures may be reversed, such as e. g. in a cooling apparatus where in this case, the side labelled exterior side is facing the interior of the apparatus.

The thermal insulation value (U value) of the glazing element may be smaller or equal to 0.8 W/(m²K), or smaller or equal to 0.6 W/(m²K) in certain examples. The improved usability of the glazing element is particularly pronounced with these low U values; this has not been determined in particular with traditional vacuum-insulated glasses. The term "glass pane" generally refers to a panel-shaped structural element made of a transparent, amorphic, non-crystalline solid material. The glazing element can be composed of flat or bent glass panes. The glass panes can consist of unhardened or hardened materials, soda-lime glass, low-alkali or alkali-free silica glasses, crystallised or partly crystallised glasses or combinations thereof, as examples. If hardened glass panes are used, the material may be selected in such a way that the surface compressive stress is at least 75 MPa on at least one glass surface.

Various options exist for the attachment of the low emissivity coating layers on at least one of the interior surfaces of the glass panes. For example, exactly one low emissivity coating layer can be provided which is arranged on one of the interior surfaces which is facing a gap between the first outward pointing glass pane and the adjoining glass pane. Alternatively, exactly two low emissivity coating layers can be provided wherein one coating layer is arranged on the interior surface of the first outward pointing glass pane and a second coating layer on another interior surface of the glazing element, such as on the interior surface of the second inward pointing glass pane. Moreover, exactly three low emissivity coating layers can be provided wherein the surface of the interior glass pane facing the outward pointing glass pane is uncoated. The mentioned variants can have advantages depending on the actual applications of the glazing element, in particular with respect to the prevention of thermal tensions.

The low emissivity coating layer comprises at least one of the components comprising coating packages containing silver, semi-transparent metals, conductive oxides or equivalent materials (materials with a correspondingly low emissivity). The use of mixtures of these structures is also possible. The optical appearance of the glazing element may be changed as little as possible with the use of these materials so that it is virtually unnoticeable.

Further advantages may be achieved if one or a plurality of the following characteristics are realized in certain examples. The thickness of the first and second glass panes may be ≦10 mm, or alternatively ≦6 mm. The selected thickness of the glass pane arranged on the inside between the first and second glass panes may be ≦6 mm. The thickness of the glass pane arranged on the inside may be alternatively ≦3 mm. Advantages with respect to the weight and handling of the glazing element may be determined with a selected thickness of the at least one glass pane arranged on the inside of ≦1.8 mm.

BRIEF DESCRIPTION OF THE DRAWINGS

Other advantageous characteristics and details are explained in more detail based on the following description with reference to the FIGS. provided in the annex.

FIGS. 5A to 5F are schematic sectional views illustrating exemplary arrangements of edge seals;

FIG. 6 is a schematic sectional view illustrating the levelling out of unevennesses of a glass pane in a glazing element;

DETAILED DESCRIPTION

Figure 1:
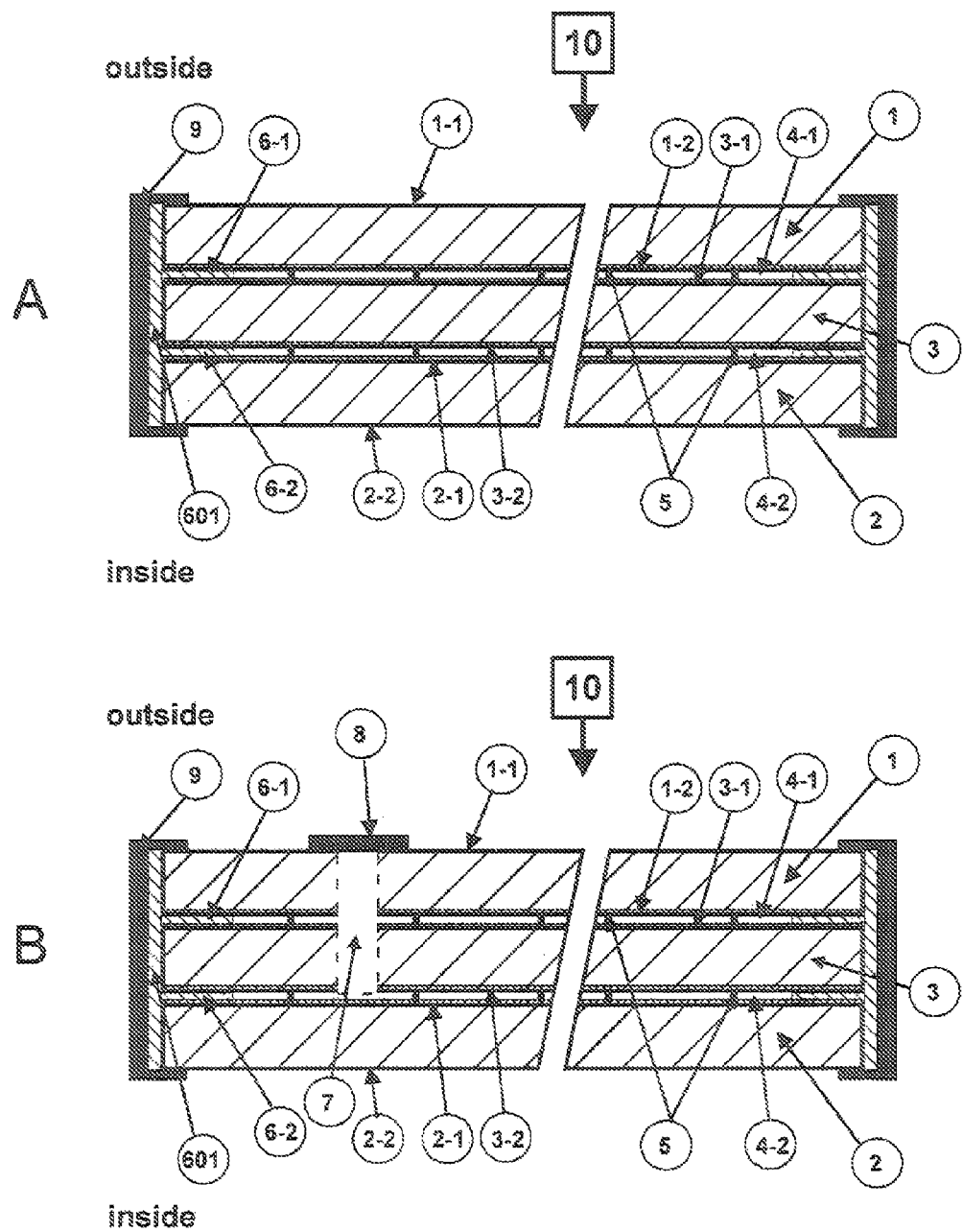
FIGS. 1A and 1B show schematic sectional views illustrating exemplary embodiments of glazing elements.

FIGS. 1A and 1B show exemplary embodiments of the glazing element 10 in a schematic sectional view (partial view). The insulating glazing element 10 comprises an at least almost parallel arrangement of at least one first outward pointing glass pane 1, one second inward pointing glass pane 2 and a third glass pane 3 arranged in between, wherein the glass panes 1, 2, 3 are almost identical in size.

The mechanical strength of the pane material may be selected at least such that it can withstand an exterior pressure with a load of approximately 10 tons per square meter or greater. Materials may be used with thermal expansion coefficients as small as possible, e. g. smaller than approximately ≦50·10$^{-6}$ K$^{-1}$ for the glass panes 1, 2, 3. Different at least partially transparent materials such as glass, glass-like materials, hard and temperature-stable synthetic materials, composite materials and compounds or equivalent materials or combinations can be used for this purpose. The further description is focusing on the exemplified use of glass, although the insulating glazing element is not limited to these cases.

The thickness of the glass panes 1, 2, 3 depends on the type of the actual use and the practical requirements derived thereof. To keep the overall thickness and as a result the weight of the component as low as possible, the thickness of the glass panes 1, 2 is typically smaller or equal to 10 mm in certain examples, depending on their actual application and geometrical dimensions. It is especially advantageous if the thickness of the glass pane 3 arranged between the glass panes 1, 2 is lower, such as at most 6 mm. However, if the need arises in the practice that thicker glass panes are used because of structural reasons and/or to reduce noise or for other reasons, this is also possible in other examples.

The glass panes 1, 2, 3 can consist of a regular single glass which can be colour-tinted, furnished, imprinted and/or painted and/or sandblasted with functional coatings for heat protection, sun protection, increase or reduction of reflection, for the regulation and control of the light and radiation passage etc. or combinations thereof. It is possible that the glass panes each are composed of a plurality of said single glasses wherein they can be joined with a method known to the person skilled in the art, such as for example with foil or casting resin compound systems, gluing or similar. Additional further combinations of the single glasses for example with synthetic materials, metals, mineral fibres and/or tissues or substances containing said materials etc. are also possible.

Spacer assemblies 5 are arranged across the entire area in the spaces 4-1, 4-2 between the glass panes 1, 2, 3. The user is required to define the quantity, size, shape, material to be used and the distribution of the spacer assemblies as well as the distances between the glass panes in such a way that the strength of the glazing system is adequate for the practical application, the glass panes do not hit one another as a result of the exposure to compressive forces and other mechanical and/or thermal stresses, the glass surfaces are not damaged or destroyed and potential cold bridges are minimized. In addition, it should be taken into account that the spacer assemblies 5 are aesthetically appealing. The spacer assemblies 5 may be designed in such a way that the positions taken up by them are virtually invisible to the naked eye and do not have a distracting effect on the user with respect to their reflexion and color.

By default, the two-dimensional arrangement of the spacer assemblies 5 is similar to a uniform dotted grid with a distance of the spacers between one another typically ranging from 20 mm to approx. 50 mm. The arrangement of the spacer assemblies may not necessarily be uniform. Because the pressure load applied to a glass construction mounted on four sides is not distributed evenly across the entire area, the spacer assemblies can be arranged closer to one another in areas of higher mechanical load (in particular in the border areas or along the diagonals) and further apart in areas with lower applied load. This allows the reduction of the total number of spacer assemblies or the specific reinforcement of high-load areas whereby the insulation and light permeability as well as the aesthetic appearance of the component can be improved among other things.

If unhardened standard float glass (soda-lime glass) is used, distances between the individual spacer assemblies 5—depending on their diameter and actual geometrical shape—of approximately 15 to approximately 40 cm are suitable. The use of glass panes comprising hardened glass on the surface is advantageous, whereby the distance can be increased to values of at least approximately 60 mm. Hardened surfaces with a surface compressive stress of at least 75 MPa are suitable. Said glasses can be produced with methods known from prior art such as for example by means of thermal (thermally pre-stressed or partially pre-stressed glass) or chemical hardening (ion exchange at the glass surface up to a total depth of approximately 150 μm).

Alternatively, the surfaces of the glasses can be functionalised as desired by applying hard and/or friction-reducing coatings onto the interior surfaces 1-2, 3-1, 3-2 and/or 2-1. Said glass coatings may consist of transparent or semitransparent hard materials such as metal oxides, metal nitrides, metal oxynitrides, metal carbides and metal carbonitrides etc., compounds containing carbon or silicium, other equivalent materials or combinations thereof. The thickness of said coatings may be at least 0.1 μm. The deposition of light-absorbing metals or metal alloys is also possible, but significantly lower layer thicknesses of less than approximately 20 nm may be provided in this case to make sure that the transparency of the glazing element is still adequate.

The glass panes 1, 2, 3 may be manufactured in such a way that no tears, recesses or other visible damages occur at the edges. The use of laser cutting methods e. g. with $CO_2$ or Nd-YAG lasers achieves adequate edge qualities. Moreover, the glass edges and edge seals are very delicate. A large number of damages originate especially in these areas. Presumably this is due to the fact that particularly high local mechanical stress develops here. It is an advantage if the edges of the glass panes 1, 2 and/or 3 are additionally rounded according to FIG. 2A. This is achieved for example by means of mechanical grinding, wherein die radii for the roundings R may be at least 5 mm, or greater or equal to 10 mm, depending on the size of the component. Another significant improvement of the mechanical stability and reliability of the glazing elements is achieved with the additional provision of a two-sided mitre joint G in the border areas with an extension $L_G$ of at least approximately 1 mm which does not exceed about 35% of the glass thicknesses.

The spacer assemblies 5 can be mounted on at least one of the glass surfaces facing the vacuum in such a way that they are for example bonded with an adhesive. For this purpose, special bonding/adhesive materials such as inorganic screening materials, solder glass, organic or inorganic composites, adhesives or other adhesion promoting materials may be applied locally onto the corresponding glass pane. This is done by means of known apparatuses and methods such as screen resist methods, conventional printing methods (jet printing), microdosing methods, print rolls etc. The spacer assemblies are then mechanically fixated precisely at these locations by means of known technical apparatuses and methods. To achieve a solid bonding connection between the spacer assemblies and the glass surface, the bonding materials are hardened for example by means of radiation (UV to IR range, microwave irradiation, concentrated laser light, etc.) and/or by means of a defined heat treatment or other known processes. The next glass pane can subsequently be placed onto the pre-fabricated glass pane and the sequence repeated for as long until the glazing element is complete.

In other cases, the bonding of the spacer assemblies can be waived. In doing so, the initial adhesion of the spacer assemblies to the glass pane required for the installation is achieved by using volatile compounds and substances as bonding agents or with the use of electrostatic attraction.

Materials with good mechanical load in compression and shearing action, additionally comprising good temperature stability and resistance and which in particular do not show any signs of outgassing or similar, allowing the creation and conservation of the vacuum between the glass panes for the long term are suitable for the manufacture of the spacer assemblies 5. The spacer assemblies may be made of a material with a high resistance to compression of at least approximately 350 MPa to approximately 1,000 MPa and higher. Due to their favourable mechanical properties, various metals such as for example titanium, tantalum, molybdenum, tungsten, copper, platinum, chromium, nickel, iron, cobalt, niobium, aluminium etc. are suitable. However, their mixtures and alloys (for example various types of steel such as for example Ni—Cr steels, Inconel, Invar etc.) or other substances containing these materials can also be used. To prevent excessive heat losses of the glazing element, it may be advantageous to use materials containing metal with a low thermal expansion coefficient in addition to heat conductivity that is as low as possible such as it is the case for example in various commercial types of stainless steel, Inconel, Invar or in micro- or nano-porous materials containing metal etc.

For further reduction of the heat loss of the component, insulating materials known from prior art may be used with a heat conductivity that is smaller than approximately 25 W/(m·K), or alternatively smaller than 5 W/(m·K). These are materials impingeable by compression such as carbides, nitrides, carbonitrides, oxides (such as for example aluminium oxide or zirconium oxide), oxynitrides, substances known as ceramics or porcelain or enamel, inorganic and/or organic composite materials, compounds, sol-gel compounds, solder glass, glass or other glass-like substances, other equivalent substances or materials containing these substances or constructions made thereof. As well, vacuum capable solid adhesives comprising at least one substance selected from the group of materials comprising acrylates, cyanoacrylates, resins, epoxy systems, polyurethanes, silanes etc. can be used. Additional coatings for the purpose of the reflexion reduction, coloration, setting of a defined electrical conductivity, friction reduction, increase of the surface hardness and so forth may be applied to the surfaces of the spacer assemblies 5 according to known methods. Moreover, it can be advantageous if the materials used for the spacer assemblies 5 are provided as liquid, paste, sticky mixture or similar form and thus can be applied directly onto the glass surfaces without expensive positioning, by means of known methods such as for example compression, jet or similar methods. However, known spacer assembly constructions comprising a compression-resistant core (metals, alloys, ceramics, etc.) with additional functional surface coating—similar to a sandwich structure—or other multi-layer constructions wherein the absorption of exterior compression and especially shearing forces with a tangential effect is improved, can be used for the glazing element.

To maintain the defined space between the glass panes 1, 2, 3, intermediate layers can be implemented which are arranged across the entire or partial area or partially in the gap 4. Thin glass fleece, known mechanically solid microporous materials or similar have proven suitable. However, no excellent U values were achieved due to the significantly higher heat conductivity between the individual glass panes.

There are basically no limits with respect to the shape of the spacer assemblies 5. Rhombohedral, rectangular, triangular, spherical, ring-shaped, curved, oval, globular or pearl-shaped, trapezoidal or pyramidal, wire-shaped (shaped or unshaped) or modified or similar geometries, cross-sections etc. can be used aside from cylindrical ones. It is essential in certain examples that the mechanical stability and strength of the entire glazing element is guaranteed.

Spherical or disk-, ring- or plate-shaped glass bodies with a typical geometrical dimension (diameter) prove to be particularly easy to manufacture and handle. Based on the optimal optical adjustment between the glass panes 1, 2, 3 and the spacer assemblies 5, the spacer assemblies can now be designed slightly larger without causing a significant impact on the viewer. Virtually all glass materials available on the market such as soda-lime glass, alkali-free or low-alkali silicate glasses, quartz glasses etc. can be used. If identical or similar glass materials are used for the spacer assemblies 5 and the glass panes 1, 2, 3, the connection between the spacer assemblies and glass panes can be created in an advantageous way by means of diffusion bonding. It can be advantageous if the surfaces of the spacer assemblies made of glass are additionally hardened by means of thermal or chemical processes known from prior art or provided with hard and/or friction-reducing coatings. The sliding friction coefficients of the friction-reducing coatings may be approximately smaller or equal to 0.3. Aside from Teflon, compounds containing carbon, silicium as well as fluoride or mixtures thereof with a coating strength of at least 0.1 μm up to approximately 5 μm known from prior art or metallic layers are suitable for this purpose.

However, it is also possible to use so-called surface-structured glass. In doing so, the glass surface will be equipped with smaller structures or elevations while in soft or partially soft status during the glass manufacture, for example by means of rolling and/or stamping. These structures which may definitely comprise a design ultimately assume the function of the spacer assemblies 5.

The spacer assemblies 5 in FIG. 1 are exemplified by a cylindrical shape. Their diameter is smaller than 1.5 mm, or alternatively smaller or equal to 1 mm and their height ranges between approximately 0.1 mm and 1.5 mm, or alternatively between 0.2 mm and 1 mm.

In the next step, the glass panes 1, 2, 3 with approximately identical size are placed flush or slightly displaced on top of one another, thus creating the edge seals 6-1, 6-2. To improve the vacuum tightness, the seals 6-1, 6-2 can be extended completely or partially beyond the edges of the glass (see 601 in FIG. 1). The edge bond 6-1, 6-2, 601 is created with the application of sealing material in the form of pre-fabricated pastes or suspensions, powders, granules, wires, tapes or films etc. whereby it is also possible to use different materials for 6-1, 6-2, 601.

Figure 2:
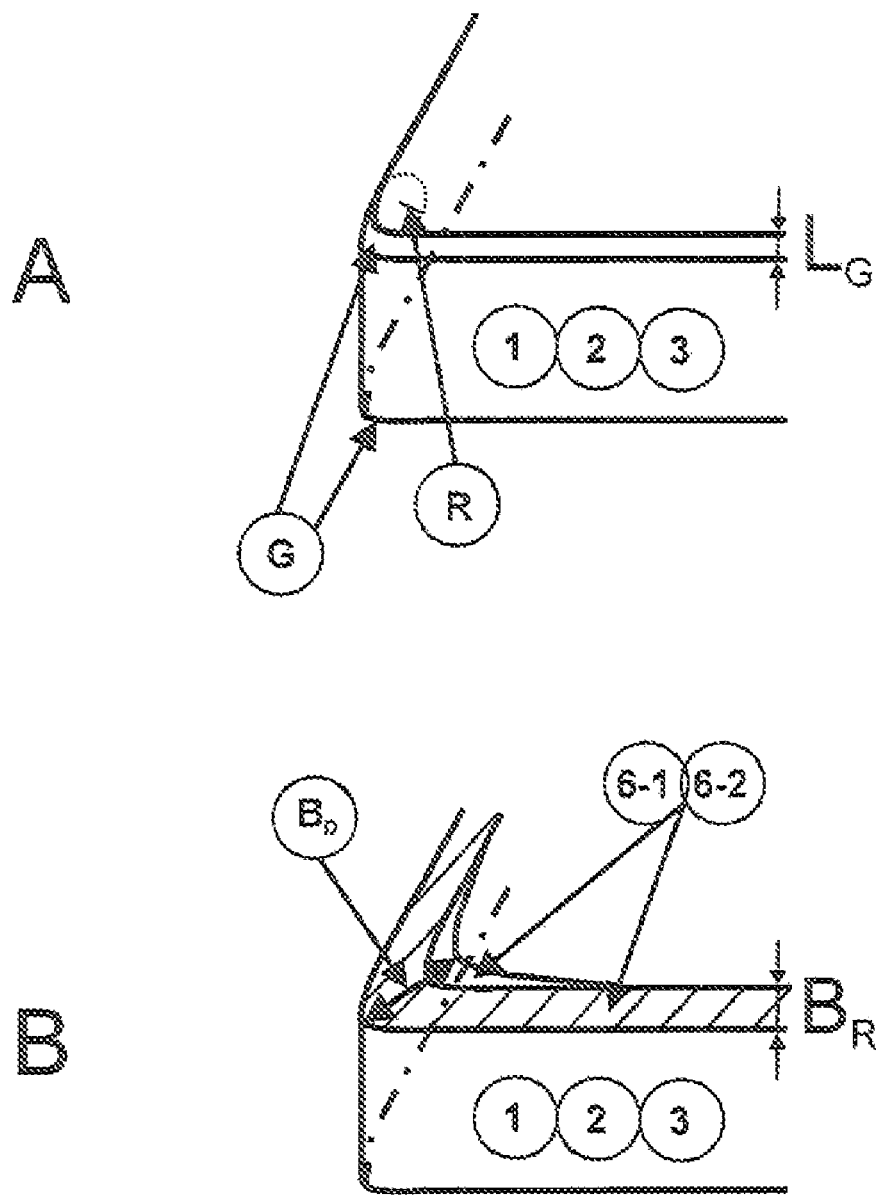
FIGS. 2A and 2B are detailed views of border areas of glass panes.

For the mechanical bracing of the edge seals 6-1, 6-2, a minimum width of approximately 3 mm, or alternatively at least 5 mm around the circumference may be utilized. Due to the particularly high mechanical load applied to the corners of the glass, these local areas are mechanically reinforced in the exemplary manner as illustrated in the diagram of FIG. 2B. Moreover, additional sealing material may be applied to these areas. The width $B_D$ of the edge seal which is rounded in the diagonals may be at least 8 mm. A suitable rule for the practical application states that the width of the edge seal $B_D$ in the corner diagonal may be designed at least 1.5 to 2.0 times as wide as the seals 6-1, 6-2 uniformly spanning the circumference of the edges with the width $B_R$.

The methods known to the person skilled in the art with respect to vacuum technology, vacuum pipe technology and lamp manufacture can be used to manufacture the edge bond. In particular, glass-metal bonding systems or solder glasses (such as metals, metal compounds and metal alloys comprising for example at least one of the components tin, lead, indium, copper, zinc and/or silver etc.), glasses or similar glass-like materials that soften at low temperatures, fritted glasses etc. can be used. As well, inorganic and/or organic composites, sol-gel compounds, organic substances containing adhesives or polymer systems (with or without additions) or similar with lower permeation can be used. The adhesive used comprises at least one substance selected from the group of materials comprising acrylates, cyanoacrylates, resins, epoxy systems, polyurethanes, silanes etc. If hardening, melting, polymerisation etc. of the sealing material is required, it will be carried out either by means of integral or wavelength-selective irradiation (UV to IR range, microwave radiation, concentrated laser light etc.) and/or by means of a defined heat treatment (for example conventional or inductive heating, resistance heating in case of electrically conductive materials, etc.) or combinations thereof. For the cost-efficient manufacture of the glazing elements, sealing materials have been proven advantageous which can be joined at low temperatures below approximately 350° C., or alternatively below 250° C. In doing so, the edge regions of the glass panes 1, 2, 3 can be sealed both under atmospheric as well as vacuum conditions.

To minimize the heat loss as a result of head conduction and heat convection, the pressure $p_v$ (vacuum) generated in the gaps 4-1, 4-2 compared to the exterior atmospheric pressure $p_0$ is lower, ranging between approximately $10^{-1}$ and $10^{-3}$ Pa or lower. The vacuum can easily be generated by means of an attached vacuum generation apparatus. In doing so, the residual gases and the water between the glass panes 1, 2, 3 are evacuated via separate opening or bore hole 7 (FIG. 1B). It can be advantageous if the temperature compared to the room temperature is set adequately high to at least 60° C. while the vacuum is created, to achieve a better desorption of the residual water in the gaps 4-1, 4-2. To minimize the evacuation time, the diameter of opening 7 is at least approximately 2 mm. After the evacuation, opening 7 is sealed vacuum-tight by means of a cover 8. To create the vacuum, it is also possible to insert a pipe into opening 7 which is glued or soldered vacuum-tight to the top of the glass pane 2 before the evacuation. After the required final pressure is reached, said pipe can be thermally fused at the top end or closed vacuum-tight by means of other known techniques. By adding an additional cap or similar, additional protection against mechanical damage during the transport or installation of the glazing element can be achieved. It may be advantageous if the final edge bond 6-1, 6-2, 601 is manufactured directly under vacuum. In doing so, the evacuation is carried out through a suitably sized opening in the edge bond which has to be closed later, wherein a tube or similar can again be inserted additionally. The vacuum in the gaps 4-1, 4-2 can be improved further with the addition of known getter materials such as for example sub-stoichiometric titanium oxide etc. between the glass panes 1, 2, 3 and/or into the border area and/or in the form of coatings on the interior surfaces 1-2, 3-1, 3-2, 2-1.

For the mechanical protection of the edge seal or the edges of the glass from damage during the practical use of the glazing element, an additional shell 9 protruding the edge by approximately 5 mm to 30 mm can be applied to the edge which can also be used as part of the edge seal.

To prevent heat losses as a result of thermal radiation, it is essential in certain examples that at least one of the interior surfaces 1-2, 3-1, 3-2, 2-1 of the insulating glazing element is equipped with a thermal protection coating. Particularly suitable for this purpose are light-permeable coatings with an emissivity of at least smaller or equal to 0.16, or alternatively smaller or equal to 0.09, or smaller or equal to approximately 0.05. Low emissivity coating layers per se are known from the practice. The application is carried out with known methods.

By using so-called combined layers which simultaneously comprise heat and sun protection properties, and/or sun protection layers and/or colored layers and/or light-absorbing layers and/or hard material layers, etc., the range of functional coatings on the interior surfaces 1-2, 3-1, 3-2, 2-1 can be combined virtually without limits. With the additional modification of the surfaces on the outside 1-2, 2-2, for example with coatings comprising water- and/or dirt-repellent effects, for the regulation of the radiation (sun protection, reflection reduction, coloration, etc.), for the design and aesthetics etc., an even greater functionality of the glazing element can be achieved.

Method for the Determination of the Solar Absorptions and for Testing the Usability of the Glazing Element The solar absorptions $A_i$ correspond to the real solar absorption occurring in each of the glass panes 1, 2, 3 of the glazing element and are determined in the wavelength range between approximately 280 nm to 2500 nm according to the standard (ISO/DIS 9050, DIN EN 410, ASTM E-424). The sum of these solar absorptions $A_i$ results from the total (overall) absorption of the insulating glazing element $A_{tot}$, which can indeed be determined easily by means of spectral measurements of the complete glazing element 10 using traditional spectrophotometers, but ultimately does not allow a specific conclusion about the individual solar absorptions $A_i$. In addition, it needs to be taken into account that due to the "optical coupling" of the individual glass panes 1, 2, 3 within the glazing element (see for example due to multiple reflexions and absorptions, etc.), the solar absorptions $A_i$ are not identical to the absorption values $A_{i,0}$ measured separately on the respective individual glasses.

The direct measurement of the absorption values $A_i$ by means of known optical measuring methods is very expensive; therefore, the solar absorptions $A_i$ may be determined mathematically. For this purpose, the glass panes 1, 2, 3 are first measured individually by means of spectrophotometry and the wavelength-dependent transmission, reflexion and absorption values across the entire spectral range between approximately 280 nm to 2500 nm determined. After that, the desired solar absorption values can be calculated at any position within the glazing element by means of known procedures and methods (see ISO/DIS 9050, DIN EN 410, ASTM E-424). As it has been shown, the influence of the spacer assemblies can be completely neglected within the scope of the measuring accuracy.

Figure 3:
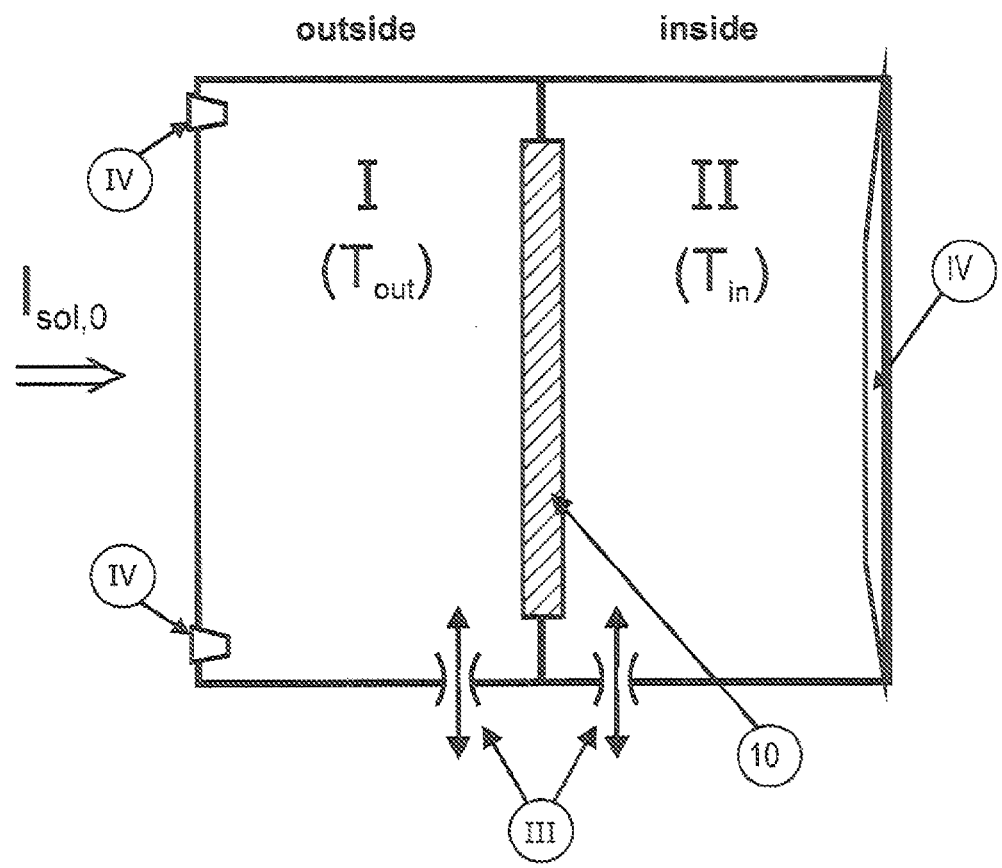
FIG. 3 is a schematic sectional view of a test chamber used to test glazing elements.

The U values of the glazing elements may be measured by means of the known pane method. A special apparatus corresponding to FIG. 3 may be used to test the usability and functionality of the glazing elements 10. The test chamber is divided into two compartments I, II that are completely separated from one another. The exterior climatic conditions (see outside temperature $T_{out}$, solar irradiation $I_{sol,0}$, fogginess, etc.) are adjusted in compartment I while the interior climatic conditions (see interior temperature $T_{in}$, condensation effects) are adjusted in compartment II. An external illumination apparatus is used to impinge the glazing elements 10 with solar irradiation $I_{sol,0}$ that is adjusted to the solar spectrum. The radiation intensity $I_{sol,0}$ is variable within a range of up to at least approximately 1200 W/m². The following test conditions were used:

a) Standard test conditions according to NFRC 100-2001:
Winter conditions:

$$T_{out}=-18°\ C., T_{in}=21°\ C., I_{sol,0}=0\ W/m^2$$

Summer conditions:

$$T_{out}=32°\ C., T_{in}=24°\ C., I_{sol,0}=783\ W/m^2$$

b) Stepped up test conditions:
Winter conditions:

$$T_{out}=-25°\ C., T_{in}=21°\ C., I_{sol,0}=500\ W/m^2$$

Summer conditions:

$$T_{out}=40°\ C., T_{in}=24°\ C., I_{sol,0}=1200\ W/m^2$$

Dry or moistened air can additionally be streamed in and out of the compartments I, II through openings III. The irrigation and moistening apparatus IV allows the simultaneous simulation of the influence of rain water hitting the outer glass pane on the usability. The temperature of every individual glass pane can be measured during the test by means of the thermal elements attached to the glass panes.

Full usability of the tested glazing elements is deemed achieved if the test items have survived all test conditions without being damaged. To obtain relatively secured statistical statements, at least five identical test items each are analysed. The test result is considered positive if no damage is determined in at least 90% of these test items.

Below is a detailed description of the particulars of exemplary embodiments.

Exemplary Embodiment 1

The glazing elements manufactured as a first embodiment comprise a design according to FIG. 1, wherein the interior surfaces 1-2, 3-1, 3-2 or 2-1 in this variant are provided with only one single low emissivity layer. The spacer assemblies 5 arranged at an approximate distance from one another of 50 mm and made of glass or ceramics are designed as thin disks with a diameter of approximately 0.5 mm and a height of approximately 0.5 mm. The size of the glazing elements ranges from approximately 0.8 m² to 5.1 m². The glazing elements only consist of materials for which the solar absorptions met the conditions (1), (2). This resulted in extreme limitations with respect to the glass types, glass thicknesses, colors and designs to be used as well as ultimately with respect to the selection of suitable low emissivity coatings, etc.

For this model, U values in the centre of the component of approximately 0.57 W/(m²K) with an emissivity $\epsilon$ of 0.09 are achieved under standardised test conditions (NFRC 100-2001). The use of a coating with an emissivity of 0.048 allows the reduction of the heat insulation to U values of approximately 0.46 W/(m²K). Even with an emissivity of only 0.17, it is still possible to set good U values of approximately 0.8 W/(m²K).

As demonstrated with experiments, full usability and functionality is achieved for all glazing elements designed according to the conditions (1), (2). It is particularly advantageous, if the low emissivity layer is either applied to the surface 1-2 or 2-1. This allows the reduction of the failure rate of the glazing element to approximately 5% and less. A particularly good stability and therefore usability under the various test conditions was achieved with glazing elements for which the effective solar absorption $A_3$ of the glass pane 3 was set to values of smaller or equal to approximately 0.10 using for example simple, neither coated nor stained standard float glass.

These embodiments are designed to achieve a partial compensation of the large temperature difference between the exterior (−18° C.) and the interior area (21° C.) according to standard test conditions. By applying the low emissivity coating to the surface positions 1-2 or 3-1 and 3-2 or 2-1, a reduced temperature gradient between "glass pane 1/glass pane 3/glass pane 2" of approximately "−17° C./13° C./18° C." and "−17° C./−11° C./18° C." is achieved. The quoted temperature values are only meant as illustration of the basic mechanism, because the exact values are subject to certain fluctuations depending on the actual conditions. The variants in which the coating was applied to the surfaces 1-2 or 3-1 have proven particularly advantageous, because the undesirable formation of condensate at the spacer assembly positions was almost completely preventable in these cases.

Exemplary Embodiment 2

In an additional variant, a total of two low emissivity coating layers are provided on the surfaces 1-2, 3-1, 3-2, 2-1. This design is of particularly great advantage because the usability of the glazing element can be significantly enhanced. The manufacture and conduct of the tests and measurements are identical to those described for exemplary embodiment 1. Again, it is crucial that the conditions for the solar absorptions of the glass panes 1, 2, 3 according to the conditions (1), (2)

in this special exemplary variant are met, because this was the only way fully usable insulating glazing elements were obtained.

It has proven advantageous that this variant allows the reduction of the U values (to as low as approximately 0.3 W/(m²K) with an emissivity of 0.048). From the point of view of optimal heat protection, the low emissivity coatings are preferably applied to the interior surfaces in the combinations (1-2 and 3-2) or (1-2 and 2-1) or (3-1 and 2-1). These variants not only achieve very low U values, but the high temperature difference between the outside (−18° C.) and the inside (21° C.) is additionally graduated even better. With respect to the combinations, virtually optimal temperature gradients for "glass 1/glass 3/glass 2" of approximately "−17° C./1.5° C./19° C" can be achieved for the winter test conditions. This in turn makes it possible to further reduce the mechanical stress mainly responsible for the damage or destruction and to provide glazing elements according to the invention with full usability at dimensions of 2.80 m×3.80 m and larger. The combination (1-2 and 2-1) is especially advantageous because almost no failures or damages were determined here.

Indeed the coating of the interior surfaces in the constellation (1-2 and 3-1) resulted in slightly poorer U values but the usability was still slightly better and the formation of condensation reduced in this variant compared to the other combinations.

Exemplary Embodiment 3

Another embodiment can be obtained with the application of a total of three low emissivity coatings onto the surfaces 1-2, 3-1, 3-2, 2-1. Basically, the latter in turn allows the selection of different arrangements for the coatings. However, it has been demonstrated that the implementation of an additional coating does not result in a significant improvement of the U value. Moreover, it is also deemed a disadvantage that more damages and failures occurred with this embodiment compared to the exemplary embodiments 1, 2. In particular, the coating of the surfaces in the combination (1-2 and 3-1 and 3-2) with layers of low emissivity quickly causes the glass pane 3 to overheat and therefore, this constellation is not suitable for practical applications. In this embodiment, the coating variant (1-2 and 3-2 and 2-1) has proven most usable in comparison to the various possible combinations.

As demonstrated, the characteristics according to the invention are not limited only to glazing elements comprising two or three glass panes. In fact, the conditions (1), (2) for the solar absorptions $A_i$ of the individual glass panes i are applicable without limitations to any expansions. For glazing elements comprising more than three glass panes, it is especially preferable if the values of the effective solar absorptions of the glass panes arranged between the outside and the inside are smaller or equal to 10%.

Exemplary Embodiment 4

In an additional embodiment, the spacer assemblies are firmly mounted on both sides of the glass pane 3. This variant is of particular advantage because no firm or rigid connection of the spacer assemblies with the surfaces of the glass panes 1 and 2 is now required and as a result especially the risk of breakage associated with the practical use of the component caused by mechanical movements and deformations of the glass panes 1, 2 can be prevented for the most part. In a particularly advantageous manner, the spacer assemblies are mounted on the glass pane 3 in a completely separate process step and independent of the actual assembly of the glazing element. This method even allows the use of glass panes 3 in industrial standard sizes of up to 3.21×6.00 m² and larger. And so, the large-sized glass panes 3 equipped with spacer assemblies 5 on both sides can be manufactured on stock, stored in large quantities like regular float glass, cut to the original size based on the actual requirements and finally be handled like a simple mid-layer within the scope of the end-assembly of the glazing element according to the invention. This made it possible to break up the complicated process steps and to reduce the manufacturing costs significantly.

Figure 4:
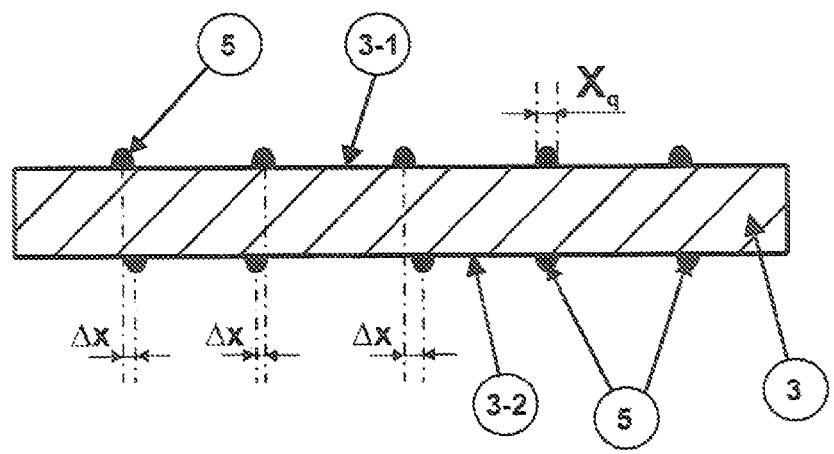
FIG. 4 is a schematic sectional view illustrating an exemplary arrangement of spacer assemblies.

FIG. 4 schematically illustrates the side section of a glass pane 3 equipped with spacer assemblies on both sides. The spacer assemblies are applied based on the previously described methods. It is particularly advantageous if the spacer assemblies are applied by means of compression or jet methods or by means of transfer films or similar, because this allows the cost-efficient mass production directly with very large pane dimensions. Materials according to the previous description can be used for the spacer assemblies. To achieve a particularly high mechanical stability as well as favourable aesthetics, it is necessary to position the spacer assemblies arranged across from one another on the surfaces 3-1, 3-2 as accurately as possible. The total deviations Δx according to FIG. 4 may be smaller than double the cross-section of the spacer assemblies $X_q$.

Because the glass pane 3 is largely exposed to the compression stress applying an almost identical load on both sides, it is even possible to use thin glass panes with thicknesses of smaller or equal to 3 mm, or alternatively with thicknesses ranging between approximately 1.8 mm and 0.5 mm. The practical use of glass panes 3 with a thickness of less than approximately 1.8 mm is therefore especially advantageous because the glass panes are flexibly ductile and as a result, possible geometrical irregularities, wavinesses and other tolerances can be compensated even better. On the other hand, said thin glass panes 3 are significantly more sensitive against higher temperatures and temperature differences, thus significantly improving the stability as well as the utilisation characteristics of the glazing element. Unhardened and hardened soda-lime glasses are used for the glass pane 3. Unhardened temperature-stable glasses such as for example alkaline-free or low-alkaline silicate glasses or similar are particularly suitable, because they allow the further reduction of the temperature sensitivity of the glazing element and as a result the associated risk of breakage. In principle, it is possible to provide one or both surfaces of the glass pane 3 with low emissivity coatings. However, unacceptable handling-related damages of the layers and as a result an undesired loss of quality often occur during production. It is particularly advantageous if the glass pane 3 is designed uncoated and the insulation layers required to achieve the low U values are applied to the surfaces 1-2 and/or 2-1.

In a particularly advantageous manner, this construction variant can be used for curved or bent components to better compensate manufacture-related tolerances occurring in the glass panes 1, 2. By using glasses with thicknesses of approximately smaller or equal to 1.8 mm in cylindrical or similarly curved glazing elements, the glass panes 3 can even be cold formed and as a result the expensive and cost-intensive thermal bending procedure may not be required.

Exemplary Embodiment 5

In further construction variants, the glass panes 1, 2, 3 have different geometrical dimensions. In FIG. 5A, the glass panes 1, 2, 3 are sized in such a way that a frame or projection around as much as possible of the entire circumference with a width of typically about 5 mm to 20 mm (see $X_b$ in FIG. 5A) is created. A sealant for the edge seal 6-1, 6-2, 601 is subsequently applied to this frame. When melted on, the material can run along the edges of the pane, create a better and more uniform adhesion while also optimally penetrating the space between the glass panes due to the capillary effect (see 6-1, 6-2). The vacuum-tightness and durability of the glazing element is improved in this advantageous way. Other advantageous modifications are shown in FIGS. 5B, 5C in which the inner glass pane 3 is protruding or recessed relative to the edges of the outer glass panes 1, 2.

FIG. 5D schematically illustrates a particularly advantageous embodiment. The mechanical load-bearing capacity of the glazing element can be increased further by installing the glass pane 3 at least partially floating or freely moveable, i. e. without a fixed connection to the edge seal. The embodiment in which the glass pane 3 is not firmly connected to any edges with the edge seal 6-1, 6-2, 601, i.e. in which it can virtually move freely between the glass panes 1, 2, is particularly suitable. This way, the most diverse exterior stresses and/or deformations and expansions and/or geometrical fluctuations can be compensated even better and especially distributed evenly. Said geometrical fluctuations develop for example as a result of measuring tolerances and irregularities (e.g. wavinesses, unevennesses, etc.) directly during the manufacture of the individual components of the glazing elements. This construction variant has proven especially suitable for the manufacture of curved or bent glazing elements.

An additional advantageous construction variant according to FIG. 5E achieves the reduction or prevention of undesired water condensation at the edge. In doing so, the glass panes 1, 2, 3 are joined in a slightly geometrically offset arrangement. However, it is crucial that the edge seals 6-1, 6-2 are not arranged directly on top of one another if possible, but are spatially separated from one another, forcing the heat and cold transport across the glass pane 3. The greater the set distance $X_e$, the easier it is to prevent the condensation. Values for $X_e$ of several millimeters to a few centimeters definitely suffice for the practice.

A further construction variant according to FIG. 5F allows the reduction or complete prevention of the undesired condensation in the border area of the glazing element by additionally heating up these areas locally. It has proven advantageous if the edge seals of the glazing element or parts thereof are additionally used as resistance heating. When conductive glass-metal bonding systems are used for the edge seal, the realisation is very simple because the used metallic substances can at the same time be used directly as Ohmic resistance. If the edge seals consist of electrically insulating substances, it is advantageous if conductive particles, wires or tapes or similar components are added or embedded. This situation is exemplified in FIG. 5F. The conductivity of the edge seal material is defined and adjusted with the additions 11-1, 11-2 and/or 11-3. The respective concentration of the additions may be carried out in such a way that the required overall resistance which also depends on the component geometry, is achieved. It is particularly advantageous if the conductive insulating coatings in the border area or parts thereof are co-used for the resistance heating.

Exemplary Embodiment 6

It is known that the surfaces of thermally pre-stressed or partially pre-stressed glasses are not uniform after the hardening process and always comprise unevennesses in the form of certain wavinesses. Said unevennesses are process- or method-intrinsic and are caused for example by the transport rolls pushing down on the glass softened by high temperatures exceeding 600° C. The position, shape, extent and amplitude of the impressed unevennesses can not be controlled and vary statistically from glass pane to glass pane and from batch to batch. Said problems are not observed with the use of chemically pre-stressed glass because lower temperatures below the transformation temperature of the glass are used in this hardening method.

Especially these wavinesses are the reason why the high mechanical loads caused by the atmospheric pressure applied from the outside can not be transferred uniformly onto the spacer assemblies and therefore extreme deflexions or mechanical stress may occur locally and have a destructive effect on the component.

The diagram in FIG. 6 is a simplified illustration of this fact. For reasons of better clarity, the glazing element is only shown with the thermally pre-stressed glass pane 1 which is characterized by the described wavinesses and the glass pane 2 which is shown completely. As demonstrated in FIG. 6, locally varying tolerances Δ occur with the spacing of the glass panes 1, 2. To obtain a uniform transmission of the effects of the exterior stress exerted on the spacer assemblies 5, they would have to comprise different geometrical dimensions. However, this is almost impossible to realise within the scope of the regular production.

This object can be solved with the method proposed below and the described process steps.

Figure 7:
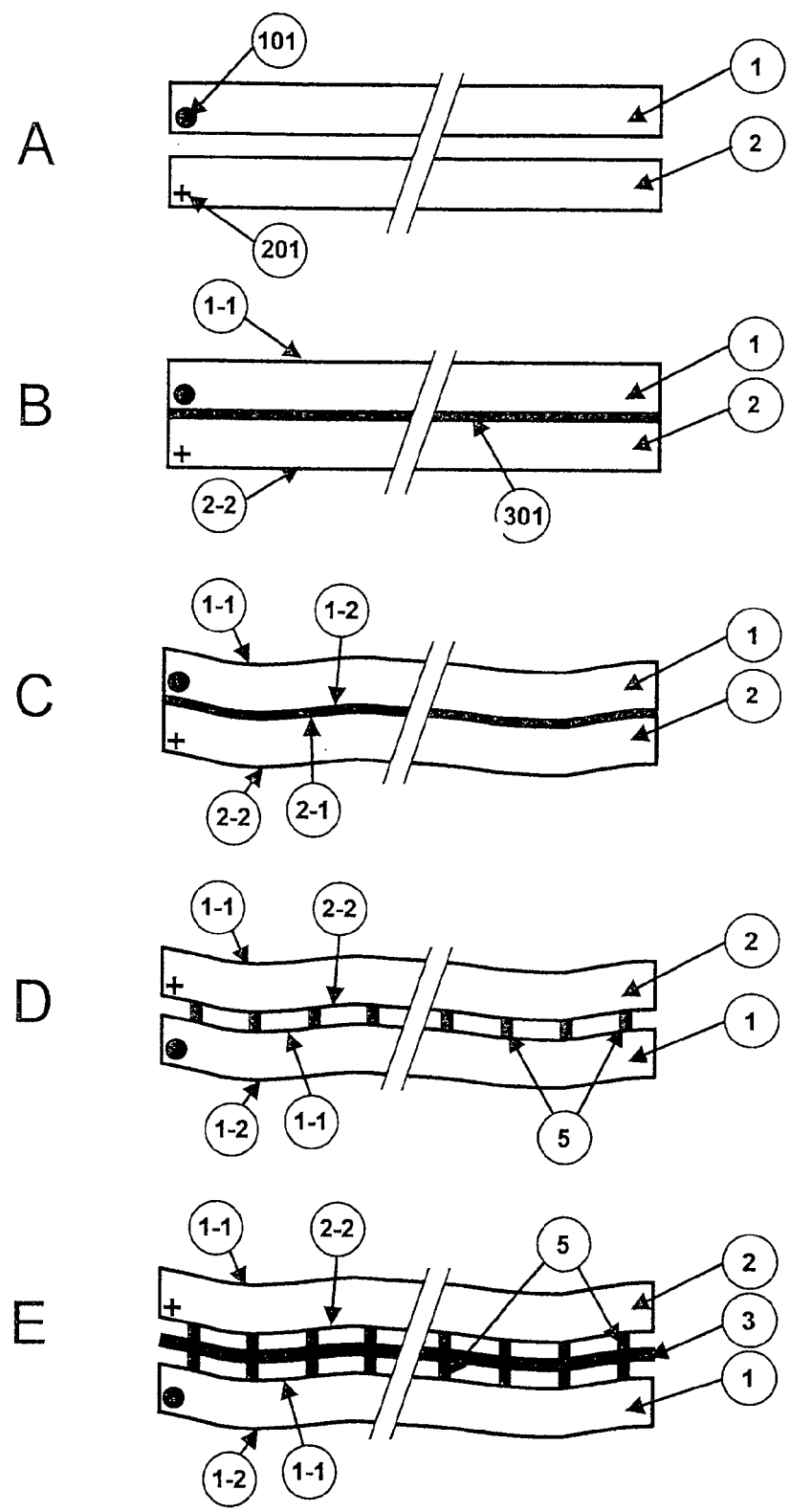
FIGS. 7A to 7E are schematic sectional views illustrating a method for the manufacture of a glazing element.

(A) Pre-Production of the Pair of Glass Panes 1, 2 (Compare FIG. 7A)

This process step initially comprises the cut of the individual glass panes 1, 2 which is optionally carried out by means of mechanical procedures or by means of a laser (for example $CO_2$-, Nd-YAG laser). Other typical work steps include the cleaning, edge preparation, application of possible bore holes etc., procedures for finishing the surface for example by means of coatings, quality control, etc.).

(B) Placement of the Glass Panes 1, 2 on Top of one Another to Form a Stack of Glass Panes (Compare FIG. 7B)

The pre-fabricated, initially plane glass panes 1, 2 are placed flush on top of one another to obtain the stack of panes 11. If necessary, clamps or other tools can be applied to prevent the glass panes from shifting. To prevent the two glass panes 1, 2, from adhering to one another during the thermal pre-stressing procedure, a middle layer that is chemically inert if possible or a separating agent 301 is inserted between the two glass panes. It is important, that 301 does not interfere with the identical design of the surface outline at the two glass panes. Special markings 101, 201 are provided in FIG. 7b for the better illustration of the assignment of the mutual position of the glass panes 1, 2.

(C) Thermal Hardening of the Stack of Glass Panes (Compare FIG. 7C)

The glass panes 1, 2 obtained following thermal pre-stressing comprise the previously described wavinesses. In an advantageous way, the wavinesses or unevennesses are imprinted completely identically on all surfaces of the two glass panes, as shown in FIG. 7C. However, contrary to conventionally hardened glass, the compression tensions (hardening) generated at the glass surfaces during the mutual abrupt cooling of the stack of glass panes 11 are not imprinted symmetrically because the cooling air can not reach the surfaces 1-2 and 2-1. As a result, the desired compression tension only develops at the surfaces 1-1 and 2-2. It is particularly advantageous if the compression tension on the glass surfaces 1-1, 2-2 is at least 75 MPa. To prevent the occurrence of innate distortion due to this asymmetrical tension distribution within the glass panes 1, 2, glass panes may be used with a minimum thickness of approximately 3 mm, depending on the size.

(D) Manufacture of the Glazing Element (Compare FIG. 7D)

Following the post-processing of the pre-stressed glass panes 1, 2 (cleaning, coating, if applicable, quality control etc.), they are then arranged inverted, according to FIG. 7D. Glass pane 2 originally arranged on the bottom now becomes the upper glass pane and vice versa. Because the surface outlines are identical in this arrangement, no tolerances Δ with respect to the distance between the glass panes 1, 2 preferably occur any more and so the mechanical stress applied from the outside can be carried uniformly by the spacer assemblies 5. The asymmetrically pre-stressed glass panes 1, 2 are arranged in such a way that the hardened surfaces 1-1,2-2 are now facing the gap 4 in a particularly preferred way. This made it possible to prevent the critical microdefects and damages caused by the high shearing and friction forces between the spacer assemblies 5 and the glass panes 1, 2 as much as possible.

This construction variant may be used for insulating glazing elements only consisting of the glass panes 1, 2. With the insertion of a preferably as thin as possible and therefore a slightly deformable glass pane 3 with a thickness of approximately smaller or equal to 1.8 mm (compare FIG. 7E), the latter can adjust to the unevennesses of the glass panes 1, 2, and so a fully functional glazing element can ultimately be obtained.

Exemplary Embodiment 7

Figure 8:
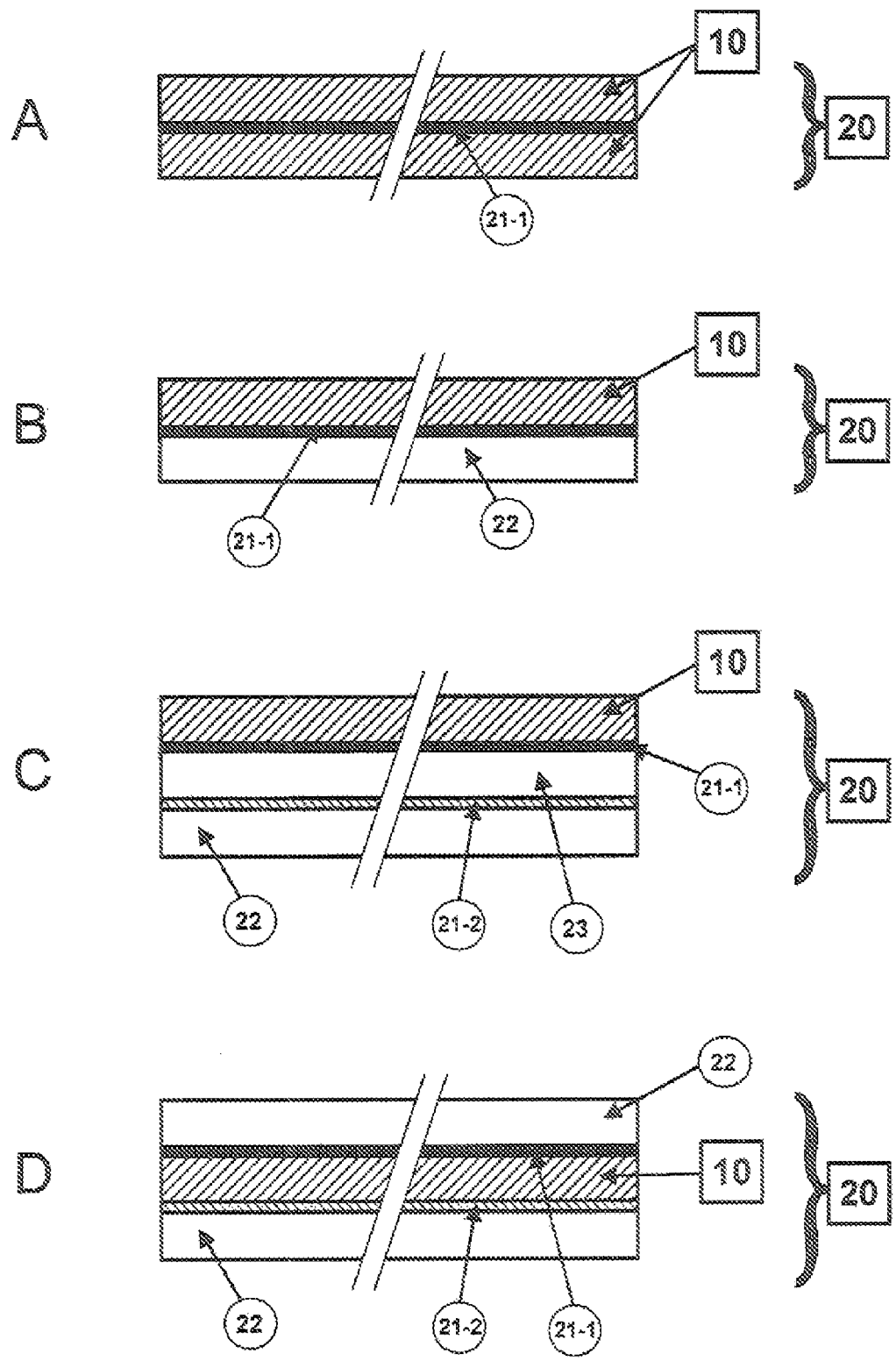
FIGS. 8A to 8D are schematic sectional views of embodiments of the component.

FIG. 8A shows an advantageous embodiment of the component 20, in which at least two glazing elements 10 are joined by at least one middle layer 21-1 to form a bond. The illustrated design allows the further improvement of both the insulation, noise protection as well as the safety properties. The bond can be created with the methods known from prior art. The so-called laminating procedure is particularly suitable, in which a bonding material such as for example a foil, a foil sandwich or a film is inserted between the glazing elements 10. The bonding material used may contain at least one synthetic material selected from the group of materials comprising polyvinyl butyral (PVB), polyurethane (PU), polypropylene (PP), polyacrylate, ethylene vinyl acetate (EVA), polyethylene, polycarbonate, polymethylmetacrylate, polyvinylchloride, polyethylene terephthalate, polyacetate resin, silicone systems, copolymers for example consisting of vinyl chloride, ethylene or acrylates, casting resins and adhesives hardenable by UV irradiation, heat or in the air. By inserting uncoated, coated, imprinted foils or foils comprising switchable functions for sun and/or light protection (for example on the basis of polycarbonate (PC), polymethylmethacrylate (PMMA) or polyethylene terephtalate (PET) etc.), synthetic panes, metal inserts etc. directly into the middle layer 21-1, the product properties of the embodiment can be varied more extensively.

FIGS. 8B, 8C and 8D contain exemplary illustrations of further construction variants of the glazing element in which the glazing element is connected either on one side (compare FIGS. 9B and 9C) or on both sides (compare FIG. 8D) with additional glass panes or pane systems sometimes comprising different materials and/or with other complete glazing systems or parts thereof.

According to the construction variant illustrated in FIG. 8B, at least one insulating glazing element 10 is for example combined with at least one additional, if possible thermally partially pre-stressed glass pane 22 or similar by means of a bond in such a way that suitable safety glass glazing elements are produced for the overhead area. However, it is also possible to replace the bonding material 21-1 shown in FIG. 8B as well as the glass pane 22 by adhesive foil. This achieves a certain protection from fragments in case of damage or destruction of the glazing element. In a different embodiment, the glass pane 22 is a completely different functional glass system such as for example fire-resisting glazing, armoured glazing, light- and energy-controlling glazing or combinations thereof. This particularly advantageous manner allows the cost-efficient combination of almost any known functional glass systems with excellent heat protection, while at the same time having a low weight and requiring a low installation depth.

In a further variant, the glazing element 10 is combined into a multi-bond according to FIG. 8C with glass panes for example comprising polycarbonate 23 and if possible hardened glass 22. The middle layers 21-1 and 21-2 do not need to be identical; in fact they can consist of completely different materials and/or be quipped with inserts. The insertion of metal foils, metal grids and/or other materials with good electrical conductivity has proven particularly advantageous because this construction variant even allows the achievement of outstanding electromagnetic protection. In doing so, a highly insulating transparent component with particularly good sound protection values as well as a superior safety standard against breakthrough, bombardment, explosions, terrorist attacks, health-impairing electromagnetic irradiations, monitoring and wiretapping attacks and other external attacks is achieved.

With a multiple arrangement of said or similar constellation of synthetic material and glass or with a double-sided multi-bond (see FIG. 8B), the sound- and safety-related properties can be improved further and even optimally adjusted to the respective use due to the multitude of possible combinations.

Exemplary Embodiment 8

When building structures in cold regions, it is now more important than ever to achieve virtually perfect insulation. The significantly lower insulation of traditional glazing systems compared to the exterior walls continues to be a significant weakness. However, constructional and structure-related requirements, such as for example the compliance with standards concerning the installation depth, design of the window frame as well as the holder systems etc. often play a key role. During the past few decades, standardised frame designs with an installation depth of for example approximately 24 mm have proven themselves over and over again in some countries. These days, conventional glazing elements with a glass distance SZR in the typical design fashion "glass with 4 mm, coated/SZR with 16 mm/glass with 4 mm" or equivalent with a U value of approximately 1.1 W/(m²K) to 1.0 (W/m²·K) are inserted into said standard frame.

Figure 9:
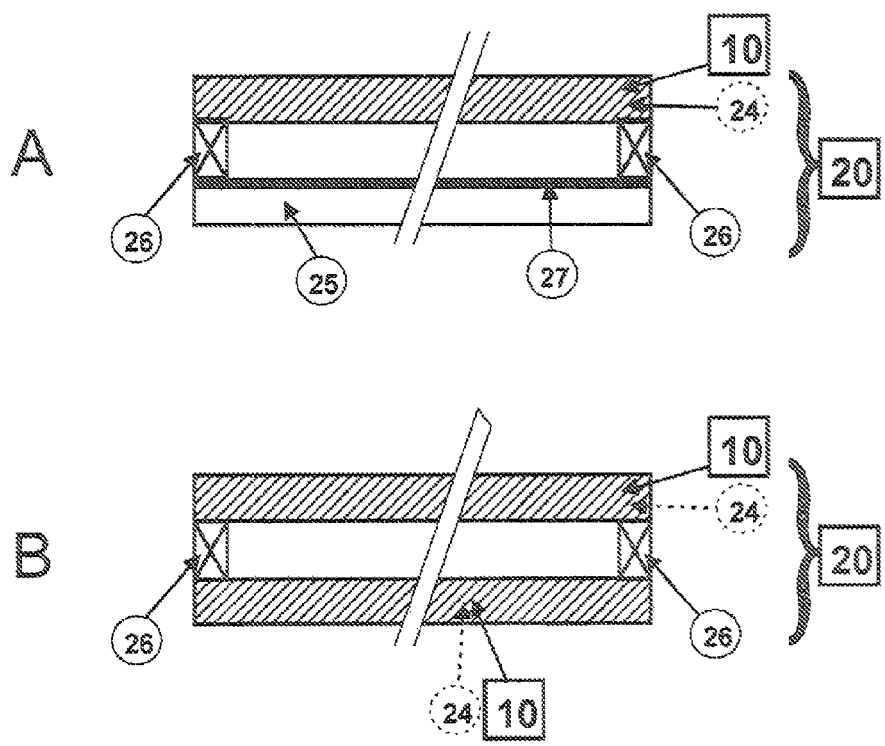
FIGS. 9 and 10 are other details of exemplary embodiments of components.

In an advantageous way, construction variants are proposed which allow the achievement of even significantly lower U values of lower or equal to 0.3 W/(m²·K) in compliance with the standard installation depths required in the practice. FIG. 9 contains an exemplary illustration of side sections of some designs 20 of such insulation glass units. Corresponding to FIG. 9A, said insulation glazing comprises an arrangement of at least two glass panes 24, 25, wherein one of them is formed with the glazing element 10. The glass panes are firmly connected by means of a spacer assembly system 26 surrounding the entire circumference and sealed toward the outside. The exemplary design of the insulation glazing corresponding to FIG. 9A is as follows:

"Glazing element 10 with approximately 12 mm/SZR with 8 mm/glass system with 4 mm" or "Glazing element 10 with approximately 10 mm/SZR with 10 mm/glass system with 4 mm".

All three individual thicknesses can thereby be varied, but it needs to be taken into account that the SZR should not be lower than 6 mm because otherwise the insulating properties of the entire glazing would again deteriorate significantly. Corresponding to the descriptions above, the glass 25 can be equipped for example with coating 27 for the purpose of further heat and/or sun protection and/or comprise different glass combinations or functional glass systems, etc. However, based on the construction variants in FIG. 8, the glazing element 10 can be combined almost arbitrarily with additional functional glass systems or other components.

An additional improvement is achieved if according to FIG. 9B both glass panes 24, 25 are formed with the glazing element 10. By designing the insulation glass corresponding to "Glazing element 10 with approximately 8 mm/SZR with 8 mm/glazing element 10 with approximately 8 mm" or "Glazing element 10 with approximately 10 mm/SZR with 6 mm/glazing element 10 with approximately 8 mm", the exemplary system depth of 24 mm can easily be achieved.

The U values can be reduced to lower than 0.3 W/(m²·K) with this construction variant.

Correspondingly, arrangements 20 comprising more than two insulating glazing elements 10 can be designed according to FIG. 9.

Exemplary Embodiment 9

The installation of the glazing element and a component comprising at least one of them e. g. into a building, vehicles, technical facilities, etc. can be done with traditional frame designs. However, the known frames often represent undesirable cold bridges. The effect is particularly grave with very low U values as they are especially present in the glazing elements.

Figure 10:
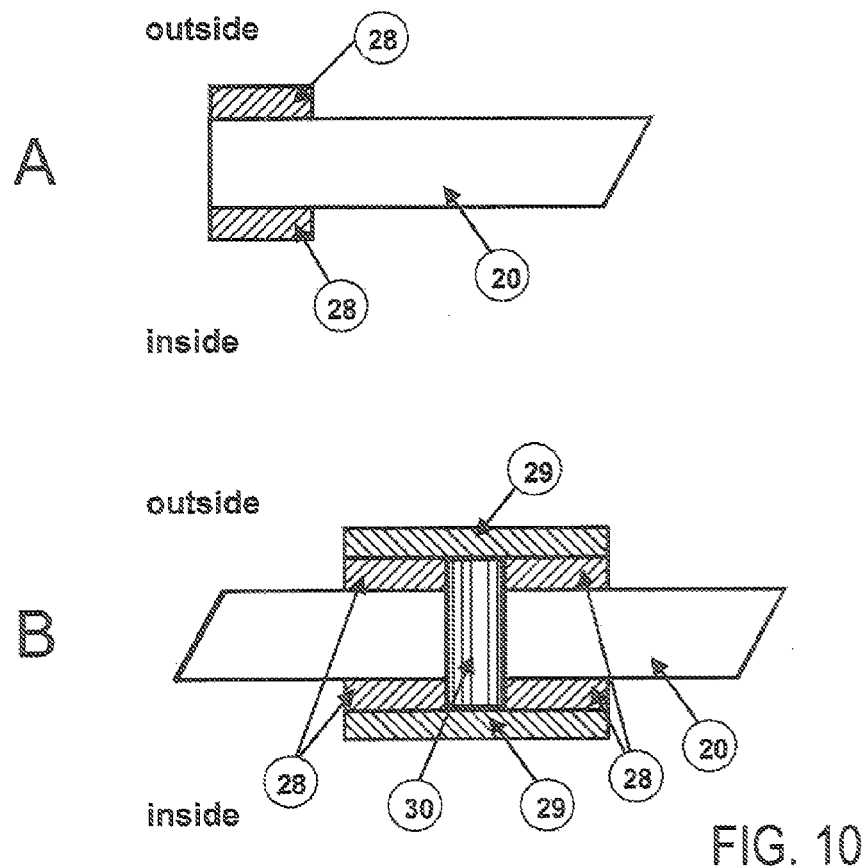

In the construction variant according to FIG. 10A, a design is proposed in which support frames 28 are attached to the edges of the component 27 if possible, either on the outside, inside or on both sides. The support frames can be mechanically connected to other components by means of a structural sub-construction and/or other support frames or similar. It is particularly advantageous if the mechanical connections are either arranged only on the outside or only on the inside. This special embodiment is schematically illustrated in FIG. 10B. The components 27 are joined by means of the mechanical assemblies 29. The elements 29 are designed in such a way that they can equally be used for installation on other structural sub-constructions or similar. This special embodiment allows the thermal decoupling of the outer and inner area. To prevent heat losses in the area between the components, highly-insulating seals 30 are applied there. Suitable materials for this purpose include porous and/or multi-layered insulating substances or highly-insulating vacuum panels. In other embodiments, the components 27 are glued directly onto a stable sub-construction or mechanically pressed on by means of structural devices, wherein it needs to be made sure again that the thermal decoupling of the exterior and interior side occurs as described.

The shown exemplary embodiments can not only be used as illustrated; in fact, any combination of these examples is possible.

The component not only comprises the use of glass or similar as pane materials which represents a special case for transparent or semi-transparent components. In principle, any at least partially transparent materials can be used which are producible in larger, pane-shaped or curved and bent geometries, possess adequate mechanical stability and are vacuum capable.

Glasses with very different chemical compositions and structural properties can be used for the glass panes 1, 2, 3. Aside from the soda-lime glass typically referred to as standard float glass, other glass types including soda-silicate glass, aluminium-silicate glass, borosilicate glass, any crystallised or partially crystallised glasses and similar are suitable as well. The individual glasses can be unhardened, thermally hardened (thermally pre-stressed), partially pre-stressed, pre-stressed or treated (chemically hardened) by means of ion exchange, modified with hard material coatings or with implantations or diffusion into the surface area.

Depending on the respective specific uses of the component, other glass types or combinations thereof can be used for the glass panes which comprises even broader possibilities of use. This may include for example: decor and design glasses, glasses with inserts such as wire glasses, etc. low- or high-reflection glasses, glasses equipped with ceramic or other colours or similar, coloured glasses or clear glass, laminated glasses (for example compound safety glasses) etc. As well, glasses with functionalised surfaces (functional layers) for example for heat and sun protection, anti-fogging, hydrophobic or hydrophilic properties, heat and UV absorption, comprising light-converting properties (photovoltaics, solar heat) and/or their combinations, etc. can be used.

The glazing element not only allows flat designs in any shapes and formats, but in particular also curved or bent ones.

The glazing element is of economic significance especially for applications where insulating properties, possibly in combination with a low weight and/or reduced installation depth and/or sound protection and/or safety and/or fire protection and/or electromagnetic protection facilities etc. are desired. Consequently, the component can be used in various areas such as the construction industry (glazing in buildings, glass roofs, glass walls, screens, heating elements, etc.), in means of transportation (cars, ships, aerodynamic vehicles, railway vehicles), as part of a machine or facility (refrigerators, freezers or other aggregates; transportation or storage facilities for cooling or heating objects or for objects requiring cooling or heating; solar collectors, energy converters, systems or similar; heating facilities; heat shields) etc.

The characteristics disclosed in the description above, the drawings and claims can be relevant individually or in combination for the realization of the aspects disclosed and its various forms, as well as in any variations, changes, omissions or additions thereof, without departing from the spirit and scope of the present invention.

The invention claimed is:

1. An insulating glazing element, comprising:
    a glass pane arrangement comprising a first outward pointing glass pane a second inward pointing glass pane, and at least a third glass pane arranged on the inside between the glass panes, wherein the glass panes comprise surfaces arranged on the inside,
    a spacer assembly provided for setting a distance between the glass panes, and
    an edge seal assembly provided for sealing gaps between the glass panes against the surroundings, wherein
    the glazing element is set up in such a way that the pressure in the gaps is lower compared to the exterior atmospheric pressure, wherein
    at least one of the surfaces arranged on the inside comprises at least one low emissivity coating layer,
    the condition $0.3 \leq (A_1/A_2) \leq 4$ is met for the solar absorptions $A_1$, $A_2$ of the first and second glass pane, respectively, and
    the solar absorption of the third, glass pane is $A_3 \leq 0.17$.

2. An insulating glazing element according to claim 1, comprising one low emissivity coating layer, wherein the layer is applied to one or more of said surfaces.

3. An insulating glazing element according to claim 1, comprising two low emissivity coating layers, one of which is applied to the surface arranged on the inside of the outward pointing glass pane.

4. An insulating glazing element according to claim 1, comprising three low emissivity coating layers.

5. An insulating glazing element according to claim 1 in which at least one of the glass panes arranged on the inside is uncoated.

6. An insulating glazing element according to claim 1 in which the emissivity of the low emissivity coating layer is lower or equal to 0.16.

7. An insulating glazing element according to claim 1 in which the low emissivity coating layer comprises coating packages containing silver, semi-transparent metal coatings, transparent conductive oxides, or mixtures thereof.

8. An insulating glazing element according to claim 1 in which the thickness of the first and second glass panes is smaller or equal to 10 mm.

9. An insulating glazing element according to claim 1 in which the thickness of at least one of the glass panes arranged on the inside is lower than the one of the first and second glass panes.

10. An insulating glazing element according to claim 1 in which the thickness of at least one of the glass panes arranged on the inside is smaller or equal to 6 mm.

11. An insulating glazing element according to claim 1 in which any one or more of the glass panes comprises at least one of unhardened or hardened materials consisting of soda-lime glass, low-alkali or alkali-free silica glasses, crystallised, partly crystallised glasses, or combinations thereof.

12. An insulating glazing element according to claim 11 in which the hardened glass panes comprise a surface compressive stress of at least 75 MPa on at least one glass surface.

13. An insulating glazing element according to claim 1 in which spacer assemblies are attached on both surfaces of the at least one glass pane arranged on the inside.

14. An insulating glazing element according to claim 1 in which the at least one glass pane arranged on the inside does not comprise a mechanically rigid connection with the edge seal assembly of the first and second glass panes along at least one edge.

15. An insulating glazing element according to claim 1 in which the at least one glass pane arranged on the inside is designed smaller along the circumference of all the edges than the first and second glass panes and does not comprise a mechanically rigid connection with the panes via edge seal at any of the edges.

16. An insulating glazing element according to claim 1 in which the spacer assemblies at least partially consist of substances with a thermal conductivity that is smaller or equal to 25 W/(m·K) and comprise a resistance to pressure of at least 350 MPa.

17. An insulating glazing element according to claim 1 in which the spacer assemblies comprise an average distance from one another that is greater than 25 mm, an average diameter that is smaller or equal to 1.5 mm and a height that ranges between 0.1 mm and 1.5 mm.

18. An insulating glazing element according to claim 1 in which the spacer assemblies are composed of sphere-, disk-, ring- or pane-shaped glass objects with a geometrical dimension that is smaller or equal to 1.5 mm and consist of materials comprising soda-lime glass, low-alkali or alkali-free silica glasses, quartz glass, crystallised or partly crystallised glasses or combinations thereof.

19. An insulating glazing element according to claim 1 in which the edge seal comprises vacuum-tight materials and is provided with a width of at least 3 mm around the entire circumference.

20. An insulating glazing element according to claim 1 in which the edge seal comprises at least one material selected from the group of substances comprising at least one of glass-metal bonding systems comprising metals, metal compounds or alloys, tin, lead, indium, copper, zinc and/or silver, solder glasses, glasses or similar glass-like materials that soften at low temperatures, fritted glasses, inorganic and/or organic composites, sol-gel compounds, adhesives and other permeation-resistant polymer systems.

21. An insulating glazing element according to claim 1 in which the edge seal comprises at least one of adhesives and permeation-resistant polymers, adhesive-permeation resistant systems each comprising at least one of organic materials of the acrylate, cyanoacrylate, resin, epoxy system, polyurethane and silane substance classes.

22. An insulating glazing element according to claim 1 in which the edges of the glass panes are rounded, wherein the radii of the rounding are at least 5 mm.

23. An insulating glazing element according to claim 1 in which the corners of the glass panes are equipped with a mitre joint of at least 1 mm preferably attached on both sides.

24. An insulating glazing element according to claim 1 in which the corner regions of the glass panes are designed mechanically reinforced with additional sealing material.

25. An insulating glazing element according to claim 24 in which the width $B_D$ of the edge seal rounded at the diagonals is at least 8 mm.

26. An insulating glazing element according to claim 1 comprising a bent or curved geometry deviating from a flatness.

27. An insulating glazing element according to claim 1 comprising a thermal insulation value (U value) that is smaller or equal to 0.8 W/(m$^2$K).

28. A component comprising at least one glazing element according to claim 1 wherein the at least one glazing element is joined on one or both sides to at least one glass component by means of compound materials.

29. A component according to claim 28 in which the compound material is realised in the form of at least one of a foil, a foil sandwich and a film and contains at least one synthetic material selected from the group of materials comprising at least one of polyvinylbutyral (PVB), polyurethane (PU), polypropylene (PP), polyacrylate, ethylene vinylacetate (EVA), polyethylene, polycarbonate, polymethyl-metacrylate, polyvinylchloride, polyethylene terephthalate, polyacetate resin, and siliconesystems, and comprising at least one of copolymers, casting resins and adhesives, which are hardenable by UV irradiation, heat or in the air, wherein the copolymers comprise at least one of vinyl chloride, ethylene or acrylates.

30. A component according to claim 28 in which the composite material contains at least one additive comprising at least one of foils and metal inserts.

31. A method for the manufacture of an insulating glazing element according to claim 1 comprising the steps:
provisioning of glass panes in a stack of glass panes, wherein at least a first glass pane and second glass pane of the glass pane stack are arranged such that the first and second glass panes are outwardly pointing;
hardening of the stack of glass panes with thermal hardening, wherein the surfaces of the glass panes are hardened asymmetrically and arranged on the outside; and
combining the glass panes in an offset arrangement wherein the hardened surfaces are arranged facing one another and a space.

32. A method according to claim 31 in which the mechanical attachment is realised separately on the exterior and/or the interior side by means of frames or other mechanical constructions thermally uncoupled from one another.

33. A method of using a glazing element according to claim 1 comprising at least one of:

as part of a building, as part of a means of transport, as part of transportation or storage facilities, as part of safety systems or facilities or as part of a machine or utility item.

* * * * *

UNITED STATES PATENT AND TRADEMARK OFFICE
CERTIFICATE OF CORRECTION

PATENT NO. : 8,221,857 B2
APPLICATION NO. : 12/519606
DATED : July 17, 2012
INVENTOR(S) : Steffen Jaeger It is certified that error appears in the above-identified patent and that said Letters Patent is hereby corrected as shown below:

In Column 1

At line 46, please change "comers" to --corners--.

In Column 3

At line 11, please delete "important" and "according to"; at line 12, please delete "the invention"; at line 14, please change "characterised" to --characterized--; at line 15, please change "preferably ≤ 0.16, especially preferred ≤ 0.09," to --≤ 0.16 in one example, and ≤ 0.09 in another example,--.

In Column 15

At line 33, please change "$X_c$" to --$X_e$--.

Signed and Sealed this
Eighteenth Day of December, 2012

David J. Kappos
*Director of the United States Patent and Trademark Office*